United States Patent [19]

Deeba et al.

[11] Patent Number: 6,093,378
[45] Date of Patent: Jul. 25, 2000

[54] FOUR-WAY DIESEL EXHAUST CATALYST AND METHOD OF USE

[75] Inventors: Michel Deeba, North Brunswick; Yiu Kwan Lui, Parlin; Joseph C. Dettling, Howell, all of N.J.

[73] Assignee: Engelhard Corporation, Iselin, N.J.

[21] Appl. No.: 08/852,458

[22] Filed: May 7, 1997

[51] Int. Cl.⁷ .................................................. B01D 53/94
[52] U.S. Cl. ........................... 423/213.5; 502/66; 502/67; 502/69
[58] Field of Search ................. 502/65, 66, 67, 502/69; 423/213.5

[56] References Cited

U.S. PATENT DOCUMENTS

| | | | |
|---|---|---|---|
| 4,134,860 | 1/1979 | Hindin et al. | 252/466 |
| 4,171,288 | 10/1979 | Keith et al. | 252/462 |
| 4,714,694 | 12/1987 | Wan et al. | 502/304 |
| 4,727,052 | 2/1988 | Wan et al. | 502/327 |
| 4,929,581 | 5/1990 | Steinwandel et al. | 502/2 |
| 4,934,142 | 6/1990 | Hayashi et al. | 60/297 |
| 5,125,231 | 6/1992 | Patil et al. | 60/274 |
| 5,157,007 | 10/1992 | Domesle et al. | 502/66 |
| 5,234,876 | 8/1993 | Swaroop et al. | 502/79 |
| 5,244,852 | 9/1993 | Lachman et al. | 502/66 |
| 5,248,643 | 9/1993 | Patil et al. | 502/67 |
| 5,284,638 | 2/1994 | Hertl et al. | 423/245.1 |
| 5,292,991 | 3/1994 | Lachman et al. | 585/850 |
| 5,409,671 | 4/1995 | Takemoto et al. | 422/180 |

FOREIGN PATENT DOCUMENTS

| | | |
|---|---|---|
| 0 499 931 A1 | 8/1992 | European Pat. Off. |
| 0 508 513 A1 | 10/1992 | European Pat. Off. |
| 4226111 A1 | 2/1994 | Germany . |
| 4226112 A1 | 2/1994 | Germany . |
| 63-95026 | 10/1989 | Japan . |
| WO 94/01926 | 1/1994 | WIPO . |
| WO 94/22564 | 10/1994 | WIPO . |
| WO 96/15992 | 5/1996 | WIPO . |
| WO 96/40419 | 12/1996 | WIPO . |
| WO 97/00119 | 1/1997 | WIPO . |

OTHER PUBLICATIONS

M. Iwamoto, "Catalytic Decomposition of Nitrogen Oxides", Petrotech 12, 888–893, 1989, no month.
SAE #950747, "Abatement of Nox From Diesel Engines, Status and Technical Challenges", Feb. 1995.
J. Guo, et al., "Nox Reduction Characteristics of PT–ZSM–5 Catalyst with Diesel Engine Exhaust", JSAE (Japan) Review, 16, pp. 21–25 (1995), no month.
D.W. Breck, "Zeolite Molecular Sieves, Structure, Chemistry and Use", J. Wiley & Sons, New York 1974, no month.
P.A. Jacobs and J.A. Martens, "Synthesis of High–Silica Aluminosilicate Zeolites", Studies in Surface Science and Catalysis, vol. 33, Ed. B. Delmon and J.T. Yates, Elsevier, Amsterdam–Oxford–New York–Tokyo, 1987, no month.
Burch, et al., "An Investigation of the Mechanism of the Selective Catalytic Reduction of No on Various Metal/ZSM–5 Catalysts: Reaction of H2/No Mixtures", Catal. Lett., 27, pp. 177–186 (1994), no month.

*Primary Examiner*—Steven P. Griffin
*Assistant Examiner*—Stuart L. Hendrickson
*Attorney, Agent, or Firm*—Richard A. Negin

[57] ABSTRACT

A catalyst composition and structure containing the same and methods for treating diesel exhaust including a catalyst comprising a precious metal on a support, a first zeolite component in the presence of a precious metal and a second zeolite component comprising a zeolite and a precious metal, and a non-catalytic pore-containing zeolite.

21 Claims, 5 Drawing Sheets

FOUR-WAY DIESEL EXHAUST CATALYST AND METHOD OF USE

BACKGROUND OF THE INVENTION

1. Field of the Invention

The present invention relates to a catalyst composition and method of using the same for the treatment of gas streams such as diesel engine exhaust streams by the oxidation of oxidizable components, such as hydrocarbons and carbon monoxide, reduction of nitrogen oxides of exhaust gases, and the reduction of volatile organic materials and organic particulates and other pollutants prior to being discharged to the atmosphere.

2. Description of Related Art

Diesel engine exhaust is a heterogeneous material which contains not only gaseous pollutants such as nitrogen oxides (NOx), carbon monoxide ("CO") and unburned hydrocarbons ("HC"), but also soot particles which comprise both a dry, solid carbonaceous fraction and a soluble organic fraction. The soluble organic fraction is sometimes referred to as a volatile organic fraction ("VOF"), which terminology will be used herein. The VOF may exist in diesel exhaust either as a vapor or as an aerosol (fine droplets of liquid condensate) depending on the temperature of the diesel exhaust.

Oxidation catalysts comprising a platinum group metal dispersed on a refractory metal oxide support are known for use in treating the exhaust of diesel engines in order to convert both HC and CO gaseous pollutants and particulates, i.e., VOF, by catalyzing the oxidation of these pollutants to carbon dioxide and water. One problem faced in the treatment of diesel engine exhaust is presented by the presence of sulfur in diesel fuel. Upon combustion, sulfur forms sulfur dioxide and the oxidation catalyst catalyzes the $SO_2$ to $SO_3$ ("sulfates") with subsequent formation of condensable sulfur compounds, such as sulfuric acid, which condense upon, and thereby add to, the mass of particulates. The sulfates also react with activated alumina supports to form aluminum sulfates, which render activated alumina-containing catalysts inactive as disclosed in U.S. Pat. No. 4,171,288. Previous attempts to deal with the sulfation problem include the incorporation of large amounts of sulfate-resistant materials such as vanadium oxide into the support coating, or the use of sulfur-resistant support materials such as α-alumina (alpha), silica and titania.

The prior art also shows an awareness of the use of zeolites, including metal-doped zeolites (i.e. catalytically active), to treat diesel exhaust. For example, U.S. Pat. No. 4,929,581 discloses a filter for diesel exhaust, in which the exhaust is constrained to flow through the catalyst walls to filter the soot particles. A catalyst comprising a platinum group metal-doped zeolite is dispersed on the walls of the filter to catalyze oxidation of the soot to unplug the filter.

EPO 92/102161.4 discloses a catalyst for reducing the particle content and/or size in diesel engine exhaust by way of the zeolitic catalyst having acidic properties. The catalyst is stated to have properties enabling it to crack long-chain aromatic hydrocarbons. Zeolites include faujasite, pentasil and mordenite. Additionally, the faujasite and mordenite can be dealuminated. The zeolite is stated to contain one or several transition elements which can include copper, nickel, cobalt, iron, chromium, manganese and/or vanadium.

Japanese Application No. S63-95026 (Publication No. H1-266854, Oct. 24, 1989) discloses a catalyst for cleaning exhaust gas. The catalyst consists of zeolite, ion-exchanged with copper and carried on a fireproof carrier. The ion-exchange site is on the surface of the zeolite supercage and the coordination site of the oxygen atom for copper ion is a four-coordinate square.

Iwamoto, Catalytic Decomposition of Nitrogen Oxides, Petrotech 12, 888–893, 1989 is directed to the reduction of nitrogen oxides and various emissions from diesel exhaust. It is taught to use copper ion-exchanged ZSM-5 or mordenite or ferrierite. U.S. Pat. No. 4,934,142 discloses an exhaust emission control device comprising a first filter provided in an exhaust system of an engine to collect particulates contained in an exhaust gas. A second filter is provided downstream of the first filter to absorb an offensive odor component. The second filter is formed by an ion-exchange of copper ions of copper carried on a zeolite.

EPO Application No. 0 508 513 A1 discloses a method for treating diesel fuel engine exhaust to reduce emission of particulates having cores of carbonaceous material and condensable hydrocarbons deposited on the carbonaceous material. The condensable hydrocarbons in the exhaust are contacted with a catalytically active solid acid material having hydrogen ions releasably retained at acidic sites thereof. The solid acid material is desirably a Y-type zeolite with (H) cations (HY zeolite), or hydrolyzed multi-valent cations such as lanthanum (LaY zeolite), cerium (CeY zeolite) and calcium (CaY zeolite) and is supported on a ceramic or metal monolith.

WO 94/01926 entitled, "Improved Zeolite-Containing Oxidation Catalyst and Method of Use" discloses catalyst compositions for treating a diesel engine exhaust stream containing a volatile organic fraction. A catalyst composition comprises a refractory carrier on which is disposed a coating of a catalytic material comprising a catalytically effective amount of ceria having a BET surface area of at least about 10 $m^2/g$ and a catalytically effective amount of a zeolite. It is also known to employ ceria and alumina as a support for a platinum group metal as a dual exhaust catalyst. The zeolite can be doped with a platinum group metal. In this composition the zeolite is employed to serve both to catalyze the oxidation of VOF and to crack the larger VOF molecules and, during period of relatively low temperature operation, to trap gas-phase hydrocarbons within the zeolite pores. If the zeolite has been doped with one or more catalytic metals or hydrogen, the trapped gas-phase hydrocarbons are brought into intimate contact with the catalytically active cations which facilitates oxidation of the hydrocarbons.

WO 97/00119 entitled, "IMPROVED DIESEL ENGINE EXHAUST GAS CATALYST AND METHOD OF USE" discloses a catalyst composition for treating a diesel exhaust stream comprising a catalytically effective amount of at least one platinum group metal on a support in the presence of at least one catalyst activity controlling compound which can be selected from the group consisting of compounds containing vanadium, gold, silver, iron and combinations thereof. The composition additionally includes a thermally stable ceria and a non-catalytic zeolite. The purpose of the zeolite is to adsorb and retain gaseous hydrocarbons below catalytic temperatures. The zeolite itself does not catalyze any of the components of the diesel exhaust stream. Zeolite is non catalytic and is not doped with catalytic materials such as platinum, iron and the like. A preferred zeolite is Beta zeolite.

WO 96/15992 entitled, "BASIC ZEOLITES AS HYDROCARBON TRAPS FOR DIESEL OXIDATION CATALYSTS" discloses compositions comprising at least one zeolite consisting essentially of a zeolite selected from the group of neutral zeolites and basic zeolites. The zeolite can be supported on a substrate carrier such as a honeycomb support which may be made of refractory metal material or metal material. The composition can further comprise oxidizing catalytic components such as at least one platinum group metal. The composition is particularly useful for treating gas streams comprising hydrocarbons. Gas streams of particular applicability include diesel engine exhaust streams which comprise hydrocarbons. Zeolites serve to adsorb the hydrocarbons at low temperatures. As the diesel exhaust gases heat up, the hydrocarbons release from the zeolite composition at a high release temperature range, typically above 175° C. and more typically above 200° C. The released hydrocarbons can then be oxidized.

WO 96/40419 is directed to a composition and method to treat diesel exhaust gas to remove carbon monoxide, hydrocarbons, and nitrogen oxides, and to minimize the production of sulfur trioxide, comprising contacting said gases under conversion conditions with an effective amount of a catalyst consisting essentially of a high activity noble metal supported on a two-component support that contains a major amount of at least one suitable zeolite and a minor amount of an inorganic refractory oxide and washcoated on a flow through monolithic carrier.

Other references which disclose process for removal of hydrocarbons carbon monoxide from gaseous compositions include U.S. Pat. Nos. 5,234,876, 5,248,643, 5,284,638, 5,292,991 and 5,244,852. Also of interest with regard to the use of zeolites in compositions to treat diesel exhaust gas are DE4226111A1 and DE4226112A2. References of interest also include Feeley, et al., ABATEMENT OF NOX FROM DIESEL ENGINES; STATUS AND TECHNICAL CHALLENGES, SAE #950747; M. Iwamoto, et al., JSAE (Japan) Review, 16, pp 21–25 (1995); and Burch, et al., AN INVESTIGATION OF THE MECHANISM OF THE SELECTIVE CATALYTIC REDUCTION OF NO ON VARIOUS METAL/ZSM-5 CATALYSTS: REACTION OF H2/NO MIXTURES" Catal. Lett., 27, pp 177–186 (1994).

The use of finely divided inorganic oxides containing vanadium and platinum group metal as active components is disclosed in U.S. Pat. No. 5,157,007. The catalyst is in the form of an open cell, monolith.

WO 94/22564 discloses a catalyst composition for treating diesel exhaust which includes ceria and optionally alumina as well as a Beta zeolite. A platinum group metal is employed to promote oxidation of CO and HC while limiting the conversion of $SO_2$ to $SO_3$.

As is well-known in the art, catalysts used to treat the exhaust of internal combustion engines are less effective during periods of relatively low temperature operation, such as the initial cold-start period of engine operation. This is because the engine exhaust is not at a temperature sufficiently high for the efficient catalytic conversion of noxious components in the exhaust. To this end, it is known in the art to employ high loads of the platinum group metal catalyst to increase catalytic activity at low temperatures. It is also known to include an adsorbent material, which may be a zeolite, as part of a catalytic treatment system in order to adsorb gaseous pollutants, usually hydrocarbons, and retain them during the initial cold-start period until the exhaust reaches a more suitable, higher temperature. As the exhaust gas temperature increases, the adsorbed hydrocarbons are driven from the adsorbent and subjected to catalytic treatment at the higher temperature as disclosed, for example, in U.S. Pat. No. 5,125,231 in which platinum group metal-doped zeolites are employed as low temperature hydrocarbon adsorbents and oxidation catalysts.

Such efforts to improve upon the performance of diesel exhaust catalysts have been problematical. This is because, the low and high temperature operating conditions, the presence of $SO_2$ and the need to effectively convert CO and HC to innocuous materials often impose competing requirements on diesel exhaust catalysts. For example, it is known that high loading of platinum group metals is required to convert CO and HC at low temperatures. However, high loading of the platinum group metal increases the rate of conversion of $SO_2$ to $SO_3$.

It is also known to modify the activity of the platinum group metals by adding appreciable amounts of vanadium oxide to the catalyst composition. Vanadium oxide reduces the activity of the platinum metal to thereby reduce the rate at which $SO_2$ is converted to $SO_3$. However, after a relatively short operating period, vanadium oxide begins to irreversibly deactivate the platinum group metal thereby decreasing the performance of the catalyst in the conversion of CO and HC.

It would therefore be a significant advance in the art of converting diesel exhaust to innocuous materials to provide a catalyst which effectively converts nitrogen oxides (NOx), CO and HC including the volatile organic fraction, while minimizing the conversion of $SO_2$ to $SO_3$.

SUMMARY OF THE INVENTION

The present invention relates to a catalyst composition and a method for oxidizing oxidizable components of diesel engine exhaust in which at least some of a volatile organic fraction of the diesel exhaust is converted to innocuous materials, and in which gaseous NOx is reduced and HC, and CO are oxidized. The present invention is directed to a catalyst comprising a support component and a precious metal component located on a support component. The catalyst comprises at least one first zeolite component in the substantial absence of a precious metal, which functions to trap hydrocarbons in an exhaust stream(s) when the zeolite is at low temperatures. As the temperature of the zeolite increases, the zeolite releases the hydrocarbons. The catalyst further comprises at least one second zeolite comprising a zeolite and a precious metal component associated with the second zeolite. For the purpose of the present invention precious metal components include gold, silver, platinum, palladium, rhodium, ruthenium and iridium. Preferably, the second zeolite component is doped with the precious metal component. The second zeolite component has as its function to participate in the catalytic reduction of nitrogen oxides preferably to nitrogen. The mixture of two zeolites and separate support and precious metal component in the catalyst composition of the present invention enhances the reaction of various pollutants such as those typically found in diesel engine exhaust.

Zeolitic materials are known to crack long chain hydrocarbons of the type found in VOF's. Additionally, certain zeolitic materials such as the at least one first zeolite component comprising a zeolite in the absence of a precious metal, with a preferred zeolite being a Beta zeolite adsorb gaseous hydrocarbons at low temperatures. In a diesel engine, such adsorption may be experienced at temperatures from ambient temperatures such as 25° C. up to as high as about 200° C. and typically up to about 150 to 175° C. At these low temperatures, VOF's are also adsorbed onto the surface of zeolites. As the temperature of the exhaust gas increases, the zeolitic material is heated typically at temperatures of above about 150° C. and more typically above about 200° C. and the adsorbed gaseous hydrocarbons are released. As the temperatures increase, typically to above about 200° C., the oxidation catalyst components such as supported precious metal catalysts can oxidize the gaseous hydrocarbons as well as hydrocarbons present from the VOF's and carbon monoxide. Accordingly, gaseous hydrocarbons which would otherwise been passed out of the exhaust system and into the atmosphere are thereby be trapped at low temperatures and released when the catalytic system is at a sufficiently high temperature at which there can be oxidation of such gaseous pollutants.

Additionally, diesel exhaust streams can contain nitrogen oxides which can be reduced to nitrogen in the presence of supported precious metal catalysts at higher temperatures, typically above 175° C. and more typically above 200° C. The second zeolite in combination with a precious metal is used to abate nitrogen oxides.

Therefore, the present invention includes two types of zeolites, at least one first zeolite which adsorbs gaseous hydrocarbons and at least one second zeolite which catalyzes the reaction of nitrogen oxides preferably to nitrogen. The composition further comprises a catalytic material such as a precious metal component located on a support component. The precious metal component can oxidize the desorbed hydrocarbons and VOF's which may be cracked or oxidized somewhat by the zeolite material and then oxidized by the supported precious metal catalyst. A particular advantage of the present invention is that the hydrocarbons are desorbed at approximately the same time the catalyst becomes active to help reduce the nitrogen oxides. By use of a hydrocarbon adsorbing first zeolite, an extra amount of hydrocarbons which acts as a reductant are introduced into the exhaust stream with the nitrogen oxides to enhance reduction of the nitrogen oxides as well as being oxidized themselves.

The catalyst comprises a support component and a precious metal component located on the support component. The support component is preferably a refractory compound which are preferably selected from the group including silica, alumina and titania compounds. Particularly preferred supports are activated, high surface area compounds selected from the group consisting of alumina, silica, silica-alumina, alumina-zirconia, zirconium silicate, titanium-alumina, alumina-chromia and alumina-ceria. The precious metal components comprise one or more precious metals selected from the group consisting of gold, silver and platinum group metals where preferred platinum group metals include palladium, platinum, rhodium, iridium with platinum being most preferred.

The catalyst can contain binders and catalytic adjuvants and stabilizers known to enhance the stability and catalytic activity of precious metal catalysts in catalytic reactions to oxidize hydrocarbons and carbon monoxide, crack and oxidize VOF's, and reduce nitrogen oxides. Such materials include rare earth materials such as ceria and rare earths such as lanthanum, praseodymium, neodymium and lanthanum components. The catalyst can further comprise nickel or iron components. Other useful stabilizers include alkaline earth metal components derived from metal selected from the group consisting of magnesium, barium, calcium and strontium.

The catalyst of the present invention may have any suitable architecture to result in the reduction of the nitrogen oxides as well as oxidation of both carbon monoxide, gaseous hydrocarbons and hydrocarbons from the VOF.

The architecture of the catalyst composition can comprise one layer having a catalyst composition which comprises the supported precious metal component, the first zeolite component and the second zeolite component. This layer can further comprise compounds to enhance and/or stabilize the catalytic function of the supported precious metal catalytic component.

In an alternative and preferred composition, there can be at least two layers of catalytic material. There can be a one layer, preferably first or bottom layer which comprises the first zeolite component, and the support and precious metal component, and another layer, preferably a second or top layer comprising the second zeolite component which comprises a zeolite and a precious metal.

Preferably, the recited catalyst compositions are supported on a catalyst carrier such as a honeycomb monolith which may be made of a suitable material such as a refractory material or a metal. A preferred embodiment is a single layer of the above composition comprising both first zeolite component and second zeolite component, and the support and precious metal component which can be coated onto the surface of the catalyst carrier.

Alternate and preferred embodiments include two layers can succeedingly be coated on the carrier surface, with one layer preferably the first or bottom layer, containing the supported precious metal catalytic component, and the other layer preferably the second or top layer, containing the second zeolite catalytic component comprising a zeolite and the precious metal. The first zeolite component comprising a zeolite in the substantial absence of a precious metal can be either in the layer containing the second zeolite component or in the layer containing the supported precious metal component. The first zeolite is preferably in the layer with the supported precious metal.

Most preferably, there can be two layers supported on the carrier. A first layer contains the first zeolite component and the supported precious metal component. The first layer can be used as a bottom layer directly on the carrier. The second layer contains the second zeolite and can be used as a top layer directly on the bottom layer. Alternatively, the layer containing the supported precious metal can be used as the first or inner layer and the layer containing the first zeolite component can be used as the second or top layer. In these embodiments, additional hydrocarbons may have to be added to the exhaust to enhance the reduction of the nitrogen oxides.

A preferred embodiment comprises a first layer containing the supported precious metal component and the second layer containing the first and second zeolite components. Preferably, the first layer is the inner or bottom layer supported directly on a carrier and the second layer is the outer or top layer supported directly on the inner layer. Alternatively, the layer containing the first and second zeolite components can be used as the first or inner layer and the layer containing the supported precious metal can be used as the second or top layer. By separating the supported precious metal catalytic component from the first zeolite component there is a passive system which permits the release of adsorbed hydrocarbons from the first zeolite to act as a reductant to enhance the reduction of nitrogen oxides by the second zeolite.

A most preferred first zeolite component is hydrogen Beta zeolite and a most preferred second zeolite component is platinum doped ZSM-5. The most preferred supported precious metal component comprises at least one precious metal or derivative thereof selected from the group consisting of gold, silver and platinum group metals where preferred platinum group metals include platinum, palladium, rhodium, iridium with platinum more preferred and platinum plus rhodium most preferred. The most preferred support is alumina.

The catalyst composition of the present invention can be in the form of a pellet or in the form of layer supported on a substrate. The preferred substrate is a honeycomb catalyst carrier which can be made of metal or ceramic. The composition, in the form of a layer, can be supported on the substrate or carrier.

The present invention includes a method for treating a diesel exhaust stream containing nitrogen oxides, carbon monoxide, gaseous hydrocarbons and a volatile organic fraction. The method comprises contacting the stream with the above recited catalyst, adsorbing at least some of the hydrocarbons on the first zeolite component and when the exhaust stream temperature is cool. The catalytic composition is heated, typically by the increased temperatures of the exhaust stream. As the catalyst temperature increases, the hydrocarbons are desorbed from the first zeolite component. At least some of the nitrogen oxides are reduced to nitrogen in the presence of the second zeolite which is the catalytic component and at least some of the desorbed hydrocarbons. Carbon monoxide, and hydrocarbons from the gaseous hydrocarbons, as well as from the VOF's including cracked VOF's, are oxidized in the presence of the supported precious metal catalytic component. The method of the invention is attained by flowing a diesel engine exhaust, e.g., the exhaust of a diesel-powered automobile or light truck, into contact under oxidation reaction conditions with a catalyst composition as described above.

A specific catalyst composition comprises, based on catalyst loading on a substrate, a supported precious metal having from about 5 to about 120 $g/ft^3$ (based on precious metal) of at least one first precious metal component, and preferably 7 to 70 $g/ft^3$ of platinum or a combination of platinum and rhodium and from about 0.5 to about 2.0 $g/in^3$ of the support, preferably alumina; from 0.05 to 1.0 $g/in^3$, and preferably 0.1 to 0.6 $g/in^3$ of the first zeolite (e.g., Beta zeolite); and from about 0.05 to 2.0 $g/in^3$ and preferably from 0.3 to 1.0 $g/in^3$ of the second zeolite (e.g., Pt/ZSM-5) which preferably contains from 3 to 50 and preferably 3 to 40 $g/ft^3$ of platinum.

An alternate embodiment of the present invention is directed to the above related method where a catalyst composition comprises a support component, preferably a refractory compound, and a precious metal component located on the support component, and at least one zeolite component comprising a zeolite and a precious metal component where the zeolite is preferably doped with the precious metal. There is no first zeolite component in the absence of a precious metal present. In terms of the above description this embodiment would contain only the at least one second zeolite component. As indicated in the Examples, the combination of a precious metal supported component and a zeolite containing precious metal results in improved NOx conversion over a broad temperature range.

In accordance with the method aspect of the present invention, there is provided a method for treating a diesel engine exhaust stream containing gaseous HC, CO and NOx, and a volatile organic fraction, the method comprising contacting the stream with any of the catalyst compositions described above under oxidizing conditions including a temperature high enough to catalyze oxidation of at least some of the volatile organic fraction. For example, the temperature of the exhaust stream initially contacted with the catalyst composition may be from about 100° C. to 800° C.

An advantage of the composition and method of the present invention has been found in treating motor vehicle engine exhaust, particularly diesel engine exhaust containing nitric oxides. It has been found that by the combination of a refractory oxide supported precious metal catalyst, a zeolite containing precious metal and most preferably a zeolite in the absence of precious metal, oxidation of oxidizable components of the exhaust gas including carbon monoxide, gaseous hydrocarbons and VOF's can be accomplished in addition to enhanced reduction of nitrogen oxides over a broad exhaust temperature range. The presence of the zeolite traps the hydrocarbons at low temperatures and releases them at higher temperatures to be used as a reducing agent for nitrogen oxide reduction. Nitrogen oxide conversion can occur at broader exhaust temperature ranges at the inlet to the catalytic converter. Nitrogen oxide conversion can be obtained with greater than 20% conversion and a temperature range of about 150° C. and more typically 175° C. up to about 350° C. and more typically up to about 325° C. Nitrogen oxide conversions of 60 percent or more have been attained.

DEFINITIONS

As used herein and in the claims, the following terms shall have the indicated meanings.

The term "BET surface area" has its usual meaning of referring to the Brunauer, Emmett, Teller method for determining surface area by $N_2$ adsorption Unless otherwise specifically stated, all references herein to the surface area of a ceria, alumina or other component refer to the BET surface area.

The term "activated alumina" has its usual meaning of a high BET surface area alumina, comprising primarily one or more γ-, θ- and δ-aluminas (gamma, theta and delta).

The term "catalytically effective amount" means that the amount of material present is sufficient to affect the rate of reaction of the oxidation or reduction of pollutants in the exhaust being treated.

The term "inlet temperature" shall mean the temperature of the exhaust, test gas or other stream being treated immediately prior to initial contact of the exhaust, test gas or other stream with the catalyst composition The term "doped" used to refer to a zeolite being doped with a metal or hydrogen, and the terms "dope" or "doping" used in the same context, means that the metal or hydrogen moiety is incorporated within the pores of the zeolite, as distinguished from being dispersed on the surface of the zeolite but not to any significant degree within the pores of the zeolite. Doping of a zeolite is preferably carried out by known ion-exchange techniques in which a zeolite is repeatedly flushed with a solution containing metal cations (or an acid to provide hydrogen ions), or the zeolite pores are flooded with such solution. However, the defined terms include any suitable technique for incorporating a catalytic moiety, e.g., one or more metals as ions or neutral metal-containing species or hydrogen ions, within the pores of the zeolite, especially by exchange or replacement of cations of the zeolite.

The term "washcoat" refers to a thin, adherent coating of a material, such as the catalytic material of the present invention, disposed on the walls forming the parallel gas flow passages of a carrier, which is typically made of a refractory material such as cordierite or other oxide or oxide mixture, or a stainless steel.

Reference herein or in the claims to ceria or alumina being in "bulk" form means that the ceria or alumina is present as discrete particles (which may be, and usually are, of very small size, e.g., 10 to 20 microns in diameter or even smaller) as opposed to having been dispersed in solution form into another component. For example, the thermal stabilization of ceria particles (bulk ceria) with alumina as described in U.S. Pat. No. 4,714,694, results in the alumina being dispersed into the ceria particles and does not provide the dispersed alumina in "bulk" form, i.e., as discrete particles of alumina.

DETAILED DESCRIPTION OF THE INVENTION AND PREFERRED EMBODIMENTS THEREOF

The present invention relates to a catalyst which is effective for treating diesel engine exhaust, particularly with regard to reducing the total particulates and gaseous hydrocarbons (HC), carbon monoxide (CO) and nitrogen oxides (NOx) content of the exhaust. The carbonaceous particulates ("soot") component of diesel engine exhaust is, as discussed above, known to be comprised of relatively dry carbonaceous particulates and a volatile organic fraction ("VOF") comprising high molecular weight hydrocarbons, typically greater than $C_9$ and usually ranging from $C_{12}$–$C_{50}$ resulting from unburned and partially burned diesel fuel and lubricating oil. The VOF is present in the diesel exhaust as either a vapor phase or a liquid phase, or both, depending on the temperature of the exhaust. In order to reduce the total particulates discharged, the volatile organic fraction, or at least a portion thereof, must be oxidized to innocuous $CO_2$ and $H_2O$ by being contacted with an oxidation catalyst under suitable reaction conditions. The gaseous pollutants, including HC, CO and NOx can be catalytically treated. The gaseous hydrocarbons (typically $C_2$ to $C_6$ containing hydrocarbons) can be oxidized to $CO_2$ and $H_2O$, and the nitrogen oxides reduced to form nitrogen ($N_2$). The catalysts of the present invention, when employed as a diesel exhaust treatment catalyst, are effective for effectuating a reduction in total particulates, and are also capable especially with the addition of a platinum group metal component and/or other catalytic metals as described below, of providing the added advantage of oxidizing a portion of the HC and CO and reducing a portion of the NOx contained in the gaseous component of the diesel engine exhaust.

The present invention includes two types of zeolites, at least one first zeolite which adsorbs gaseous hydrocarbons and at least one second zeolite which catalyzes the reaction of nitrogen oxides preferably to nitrogen. The composition further comprises a catalytic material such as a precious metal component located on a support component.

The first zeolite component of the present invention is able to trap hydrocarbon molecules which might otherwise, during periods when the exhaust gas is relatively cool, escape untreated from the catalyst. It is believed that at least some of the trapped hydrocarbons are either oxidized within the zeolite or released from the zeolite when the temperature of the catalyst composition is high enough to effectively catalyze oxidation of the trapped hydrocarbons, or both. The first zeolite comprises a zeolite in the substantial absence of a precious metal component. By the substantial absence of a precious metal component it is meant that the zeolite is not doped with a precious metal nor is there a significant amount of a precious metal supported on the zeolite. It is recognized that in catalyst compositions certain amounts of precious metal may migrate or diffuse to the surface of the zeolite. For the purpose of the present invention such precious metal which is not intentionally located on the zeolite but migrates in minor amounts is considered to be insubstantial on the first zeolite component. The first zeolite preferably comprises a three-dimensional zeolite characterized by pore openings whose smallest cross-sectional dimension is at least about 5 Angstroms and preferably has a silicon to aluminum atomic ratio ("Si:Al atomic ratio") of greater than 5, and typically greater than 25, e.g., with a useful Si:Al atomic ratio is from about 5 to 400. The first zeolite can be acidic, basic or neutral.

The second zeolite component of the present invention is able to catalyze the reduction of nitrogen oxide molecules which might otherwise escape untreated from the catalyst. Preferably, the reaction is enhanced by the use of a reducing agent such as hydrocarbons some of which may be stored in the first zeolite and some which may additionally be stored in the second zeolite. At least one second zeolite component comprises a zeolite and a precious metal component. Preferably, the second zeolite component is doped with a precious metal. Additionally, or alternatively, the precious metal may be supported on the second zeolite component.

Zeolites particularly suitable for use as the first zeolite or the second zeolite in accordance with the invention include the following structure types: faujasites, pentasils, mordenites, ZSM-12, zeolite beta, zeolite L, zeolite omega, ZSM-22, ZSM-23, ZSM48, EU-1, etc. The zeolite of the pentasil type preferably has an $SiO_2$ to $Al_2O_3$ ratio of 25 to 2000 and, more preferably, between 40 to 60.

Zeolites can be characterized by general formula (I):

$$M^1 n[mM^2O_2.nSiO_2].qH_2O \qquad (I)$$

in which

M$^1$ is an equivalent of an exchangeable cation corresponding in number to the M$^2$ component;

M$^2$ is a trivalent element which, together with the Si, forms the oxidic skeleton of the zeolite;

n/m is the $SiO_2$ to $M^2O_2$ ratio and q is the quantity of absorbed water.

In terms of their basic structure, zeolites are crystalline aluminosilicates which are made up of a network of $SiO_4$ and $M^2O_4$ tetrahedrons. The individual tetrahedrons are attached to one another by oxygen bridges via the corners of the tetrahedrons and form a three-dimensional network uniformly permeated by passages and voids. The individual zeolite structures differ from one another in the arrangement and size of the passages and voids and in their composition. Exchangeable cations are incorporated to compensate the negative charge of the lattice which arises out of the $M^2$ component. The absorbed water phase $qH_2O$ is reversibly removable without the skeleton losing its structure. $M^2$ is often aluminum, although it may be partly or completely replaced by other trivalent elements.

A detailed description of zeolites can be found, for example, in the book by D. W. Breck entitled "Zeolite Molecular Sieves, Structure, Chemistry and Use", J. Wiley & Sons, New York 1974. A further description, particularly of high-silica zeolites suitable for catalytic applications, can be found in the book by P. A. Jacobs and J. A. Martens entitled "Synthesis of High-Silica Aluminosilicate Zeolite", Studies in Surface Science and Catalysis, Vol. 33, Ed. B. Delmon and J. T. Yates, Elsevier, Amsterdam-Oxford-New York-Tokyo, 1987.

In the zeolites used in accordance with the invention, $M^2$ can be one or more elements selected from the group consisting of Al, B, Ga, In and Fe and preferably one or more elements from the group consisting of Al, B, Ga and Fe, with Al most preferred.

The exchangeable cations $M^1$ present in the zeolites mentioned may be, for example, those of K, Mg, Ca, Sr, Ba and also transition metal cations, such as, for example, Mn, Fe, Co, Ni, Cu, Rh and Pt. Cations of the rare earth group and protons are also suitable.

In specific embodiments, the first zeolite is characterized by general formula (I) wherein $M^2$ comprises a trivalent metal and $M^1$ comprises substantially no precious metal. Preferably, the first zeolite is characterized by general formula (I) wherein $M^2$ comprises at least one metal selected from the group consisting of Al, B, Ga, In, Fe, Cr, V, S and Sb and $M^1$ is selected from the group consisting of hydrogen and/or at least one metal selected from the group consisting of K, Mg, Ca, Sr, Ba, Mn, Fe, Co, Ni and Cu. Most preferred $M^2$ is Al and most preferred $M^1$ is selected from H, Mg, Ca, Sr, Ba and Mn, with H being most preferred. More preferred, first zeolites are selected from the group consisting of faujasites, pentasils, mordenites, Y and beta, with pentasils and beta most preferred. The most preferred, first zeolite comprises beta zeolite. Preferably, the first zeolite comprises a three-dimensional zeolite characterized by pore openings whose smallest cross-sectional dimension is at least about five Angstroms and having a silicon to aluminum atomic ratio of greater than 5.

The second zeolite is preferably doped with a precious metal. Preferably, the second zeolite is doped with at least one precious metal selected from the group consisting of Pt and Rh.

In specific and preferred embodiments, the second zeolite is characterized by general formula (I) wherein $M^2$ comprises a trivalent metal. Preferably, the second zeolite is characterized by general formula (I) wherein $M^2$ comprises at least one metal selected from the group consisting of Al, B, Ga, In, Fe, Cr, V As and Sb and $M^1$ is selected from the group consisting of hydrogen and/or at least one metal selected from the group consisting of Mg, Cr, Sr, Ba, Mn, Fe, Co, Ni, Cu, Rh, and Pt with at least one of Pt and Rh included. More preferably, the second zeolite is selected from the group consisting of faujasites, pentasils, mordenites and ZSM-5 where said second zeolite is doped with at least one precious metal. The most preferred second zeolite comprises Pt doped ZSM-5.

In a preferred catalyst, the first zeolite is beta zeolite and the second zeolite is ZSM-5 doped with the platinum.

The catalyst composition further comprises at least one first support and at least one first precious metal component in addition to the first and second zeolite components.

The composition of the present invention can optionally contain a binder for the zeolite. Preferred binders are alumina, silica, silica-alumina and zirconia. Typically the amount of binder is from 1 to 10, and preferably from 3 to 7 and most preferably 3 to 5 weight percent based on the weight of the zeolite. Other materials useful as binders include titania and rare earth materials such as ceria and their precursors. Materials useful as support materials reviewed below may also serve as binders.

The support materials are preferably refractory oxide materials which are preferably selected from the group from including silica, alumina and titania compounds. Particularly preferred supports are activated, high surface area compounds selected from the group consisting of alumina, silica, titania, zirconia, silica-alumina, alumina-zirconia, alumina-chromia, alumina-ceria zirconium-silicate and titanium-alumina.

The support preferably comprises a high surface area refractory oxide support. Typically, the particles of the support have at least 90% of the particles having an average diameter of less than 15 microns and more typically the support has 90% of the particles having an average diameter of less than 10 micrometers. For the purpose of the present invention, particle size is measured using a Brinkman particle size analyzer. The particle size distribution is indicated by a percent of particles having an average particle diameter less than a given number in micrometers. Nominally, particles of the combination of precious metal and other components supported on a support are considered to have the same particle size as the support.

Useful high surface area supports include one or more refractory oxides. These oxides include, for example, silica and alumina, titania and zirconia include mixed oxide forms such as silica-alumina, aluminosilicates which may be amorphous or crystalline, alumina-zirconia, alumina-chromia, alumina-ceria and the like and titanium-alumina and zirconium-silicate. The support is preferably comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 to 350 $m^2/g$, and typically 90 to 250 $m_2/g$.

The catalyst of this invention comprises at least one precious metal component in an amount sufficient to provide compositions having significantly enhanced catalytic activity to oxidize VOF and gaseous hydrocarbons and carbon monoxide and reduce nitrogen oxides. As used herein, the term "precious metal components" include gold, silver and "platinum group metal component" including platinum, rhodium, platinum, ruthenium and iridium components and means any such platinum group metal compound, complex, or the like which, upon calcination or use of the catalyst decomposes or otherwise converts to a catalytically active form, usually, the metal or the metal oxide.

The precious metal component, such as a platinum group metal catalytic component, can be a suitable compound, and/or complex of any of the platinum group metals to achieve dispersion of the catalytic component on the support, preferably selected from titanium-alumina, titanium silicate, activated alumina and/or ceria-zirconia composite support particles. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, $((MEA)_x Pt(OH)_6)$ rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide.

The preferred precious metal component of the specific catalyst composition is preferably a platinum or platinum/rhodium component which is typically used as a layer to coat a monolithic honeycomb substrate. The total precious metal component loading based on grams of precious metal per volume of monolith is from 5 to 400 $g/ft^3$, preferably 15 to 250 $g/ft^3$, preferably from 10 to 150 $g/ft^3$ and more preferably from 25 to 100 $g/ft^3$. The loading on the refractory oxide support is preferably from 5 to 200 $g/ft^3$, more preferably from 5 to 100 $g/ft^3$ and most preferably from 20 to 75 $g/ft^3$. The loading on the second zeolite is preferably from 3 to 100 $g/ft^3$, more preferably from 5 to 75 $g/ft^3$ and most preferably from 15 to 50 $g/ft^3$. The precious metal is preferably doped on the second zeolite.

The composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the composition of the present invention preferably use alkaline earth metal components. The alkaline earth metal components are preferably alkaline earth metal oxides. In particularly preferred compositions, it is desirable to use strontium oxide and/or barium oxide as the compound in the composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides. The amount of stabilizer can be from 0.05 to 30 weight percent based on the weight of the support material and stabilizer.

The composition can contain a zirconium compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The composition preferably contains at least one promoter selected from the group consisting of praseodymium metal components and neodymium metal components with the preferred components being praseodymium oxide (praseodymia) and neodymium oxide (neodymia). While these compounds are disclosed to act as stabilizers, they can also act as reaction promoters. A promoter is considered to be a material which enhances the conversion of a desired chemical to another. The promoter enhances the catalytic conversion of carbon monoxide and hydrocarbons into water and carbon dioxide and nitrogen oxides into nitrogen and oxygen. The praseodymium compound may also provide as an oxygen storage function.

The praseodymium and/or neodymium components are in the form of their oxides. Preferably, these compounds are initially provided in a soluble form such as an acetate, halide, nitrate, sulfate or the like to impregnate the solid components for conversion to oxides. It is preferred that in the promoter be in intimate contact with the other components in the composition including and particularly the platinum group metal.

A particularly useful catalyst composition of the present invention comprises a catalytically effective amount of a precious metal component, preferably platinum, a platinum component or a combination of platinum and rhodium components with typically 5 to 400 $g/ft^3$ and more typically 15 to 250 $g/ft^3$, based on the platinum or rhodium metal. Platinum can be used at from 5 to 100 $g/ft^3$, and when used is typically in an amount of at least 10 $g/ft^3$ and more typically 25 to 150 $g/ft^3$ and more preferably from 35 to 125 $g/ft^3$ by weight of platinum component. Where platinum and rhodium are used there can be from 10 to 400 and preferably 25 to 150 $g/ft^3$ of platinum and 0.1 to 75 and preferably 1 to 25 $g/ft^3$ of a rhodium component.

The catalyst composition can be coated as one or more layers on a monolithic substrate generally which can comprise a loading of from about 0.50 to about 5.0, preferably about 0.5 to about 2.0 $g/in^3$ of catalytic composition per layer based on grams of composition per volume of the monolith.

The catalyst composition of the present invention can be made by any suitable method. A preferred method comprises mixing a mixture of a solution of at least one water-soluble, precious metal component, and finely-divided, high surface area, refractory oxide which is sufficiently dry to absorb essentially all of the solution to form a slurry. The precious metal component is preferably comminuted in the slurry. In particularly preferred embodiments the slurry is comminuted to result in substantially all of the solids having particle sizes of less than about 15 micrometers in average diameter. The supported precious metal component in the resulting slurry can be converted to a water insoluble form by a fixing step. The precious metal component can be converted to insoluble form thermally, chemically or by calcining. The precious metal can be thermally fixed to the support in air at preferably at about 50° C. to 550° C. for from 0.5 to 2.0 hours.

The slurry useful for the present compositions can also be prepared by the method in disclosed in U.S. Pat. No. 4,134,860 (incorporated by reference) generally recited as follows.

A finely-divided, high surface area, refractory oxide support is contacted with a solution of a water-soluble, catalytically-promoting metal component, preferably containing one or more platinum group metal components, to provide a mixture which is essentially devoid of free or unabsorbed liquid. The catalytically-promoting precious metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. The composite remains essentially dry, i.e. it has substantially no separate or free liquid phase. During the latter process the metal component can be fixed on the support.

After the catalytically-promoting metal solution and high area refractory oxide support are combined the catalytically-promoting metal component can be fixed on the support, i.e., converted to essentially water-insoluble form, while the composite remains essentially devoid of free or unabsorbed aqueous medium. The conversion may be effected chemically, by treatment with a gas such as hydrogen sulfide or hydrogen or with a liquid such as acetic acid or other agents which may be in liquid form, especially an aqueous solution, e.g. hydrazine. The amount of liquid used, however, is not sufficient for the composite to contain any significant or substantial amount of free or unabsorbed liquid during the fixing of the precious metal on the support. The fixing treatment may be with a reactive gas or one which is essentially inert; for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other forms. When a plurality of precious metal components are deposited on a support, fixing may be employed after each metal component deposition or after deposition of a plurality of such metal components.

A slurry containing the fixed, precious metal component can be combined with the first and/or second zeolite components and various other additives, as recited and comminuted as a slurry to provide solid particles that are advantageously primarily of a size of less than about 15 microns. The slurry can be used to coat a macrosize carrier, typically having a low surface area, and the composite is dried and may be calcined. In these catalysts the composite of the precious metal component and high area support exhibits strong adherence to the carrier, even when the latter is essentially non-porous as may be the case with, for example, metallic carriers, and the catalysts have very good catalytic activity and life when employed under strenuous reaction conditions.

The method provides compositions of uniform and certain precious metal content since essentially all of the precious metal component thereby added to the preparation system remains in the catalyst, and the compositions contain essentially the calculated amount of the active precious metal components. In some instances a plurality of precious metal components may be deposited simultaneously or sequentially on a given refractory oxide support. The intimate mixing of separately prepared precious metal component refractory oxide composites of different composition made by the procedure of this invention, enables the manufacture of a variety of catalyst whose metal content may be closely controlled and selected for particular catalytic effects. The composition may have a platinum group metal component on a portion of the refractory oxide particles, and a base metal component on a different portion of the refractory oxide particles. This process is advantageous in that it provides catalysts which can be readily varied and closely controlled in composition.

In making catalysts by this invention, the precious metal, first and second zeolite composition derived from the slurry, having fixed or water-insoluble catalytically-promoting metal components and high area supports can be combined with a macrosize carrier, preferably of low total surface area. In order to deposit the catalytically-promoting group metal-support catalyst structure of one or more layers on the macrosized carrier, one or more comminuted complete slurries are applied to the carrier in any desired manner. Different compositions made in accordance with the present invention can be applied in separate layers. Thus the carrier may be dipped or sprayed with the complete slurry, until the appropriate amount of slurry is on the carrier. The slurry employed in depositing the catalytically-promoting metal component-high area support composite on the carrier will often contain about 20 to 60 weight percent of finely-divided solids, preferably about 35 to 45 weight percent. Alternatively, the catalyst composition can be used in the form of a self-supporting structure such as a pellet. The composition can be prepared and formed into pellets by known means.

The comminuted catalytically-promoting metal component-high surface area support composition can be deposited on the carrier such as a metal or ceramic honeycomb in a desired amount. For example, the composite may comprise about 2 to 30 weight percent of the coated carrier, and preferably about 5 to 20 weight percent. The composition deposited on the carrier is generally formed as a coated layer over most, if not all, of the surfaces of the carrier contacted. The combined structure may be dried and calcined, preferably at a temperature of at least about 250° C., but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 1 to 8 weight percent of aluminum and 0 to about 20 weight percent of nickel. The preferred alloys may contain small or trace amounts of one or more other metals such as molybdenum, copper, silicon, niobium, titanium and the like. The surfaces of the metal carriers may be oxidized at quite elevated temperatures, e.g. at least about 800° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 600 or more flow channels ("cells") per square inch of cross section, although far fewer may be used. For example, the carrier may have from about 60 to 600, more usually from about 200 to 400, cells per square inch ("cpsi").

The catalytic compositions made by the present invention can be employed to promote chemical reactions, especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 700° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The present invention is illustrated further by the following examples which are not intended to limit the scope of this invention.

EXAMPLE 1

Reference Sample 1 (R-1)

This reference catalyst (R-1) was made of three components.

The first component was a Pt/Fe/$Al_2O_3$ prepared as follows: 70.29 g of Pt amine hydroxide $(MEA)_x$ $Pt(OH)_6$ complex (18.4% Pt) was made into a dilute solution to 200 g with deionized water. The Pt solution was impregnated onto 600 g of gamma-alumina SBA-90 while mixing. After mixing for 15 minutes add 48 ml of 50% volume % acetic acid was added to the solution. Mixing was continued for another 15 minutes. The Pt/$Al_2O_3$ was then impregnated with iron nitrate solution prepared by dissolving 9.22 g of Fe($NO_3$)3.9$H_2O$ in 50 g of water. The wet catalyst was made into a slurry by adding enough water to make 46% solid. The slurry was then milled to 8 microns or less.

The second component of the catalyst was Pt/$CeO_2$ prepared by impregnating 17.54 g of $(MEA)_x$ $Pt(OH)_6$ complex salt diluted with 180 g of water onto 600 g of particulate bulk ceria ($CeO_2$). The wet catalyst was then added over the first portion catalyst slurry and mixed.

The third component was a H-Beta zeolite made by exchanging Na-Beta zeolite using acidic solution at pH of 3. 600 g of H-Beta zeolite was made into a slurry by adding 600 g of water to the H-Beta zeolite. $HNO_3$ was added to a pH of 3.5. The slurry was milled to 90% less than 10 microns. The slurry was then combined with the Pt/$Al_2O_3$ and Pt/$CeO_2$ slurries and milled again to a particle size with 90% less than 10 microns.

The finished slurry was adjusted to give 45 weight percent solids with a viscosity of 120 cps. The catalyst was then coated onto a 1.5 inch diameter ×3.0 inch long ceramic honeycomb substrate 400 cells per square in to a washcoat loading with a target weight of 1.95 g/$in^3$. The coated honeycomb was then dried at 100° C. for several hours and calcined at 550° C. for 2 hours. The catalyst is referred to as R-1.

EXAMPLE 2 (E-1)

The catalyst reference R-1 on the honeycomb substrate given in Example 1 was over (or top) coated with a layer of Pt incorporated ZSM-5 (Pt/ZSM-5). The 0.5% Pt/ZSM-5 was prepared by dissolving 22 g of Pt($NH_3$)4$Cl_2$ in 3100 ml of water. The solution was then mixed with 2500 g of ZSM-5. 481 g of Nalco 1056 colloidal solution (Nalco 1056 made of 26% silica and 4% alumina). Enough water was added to the slurry to make 35 weight percent solids. The slurry had a viscosity of 140 cps with particle size distribution of 9 microns and pH of 7.

The slurry containing the Pt/ZSM-5 was then coated on the calcined 1.5 inch diameter ×3.0 inch long substrate made in Example 1 which was coated with reference catalyst R-1. The Pt/ZSM-5 slurry was coated to a target weight of 1 g/$in^3$. The catalyst was then dried at 100° C. and calcined at 550° C. for 2 hours. This catalyst was labeled E-1.

Figure 1:
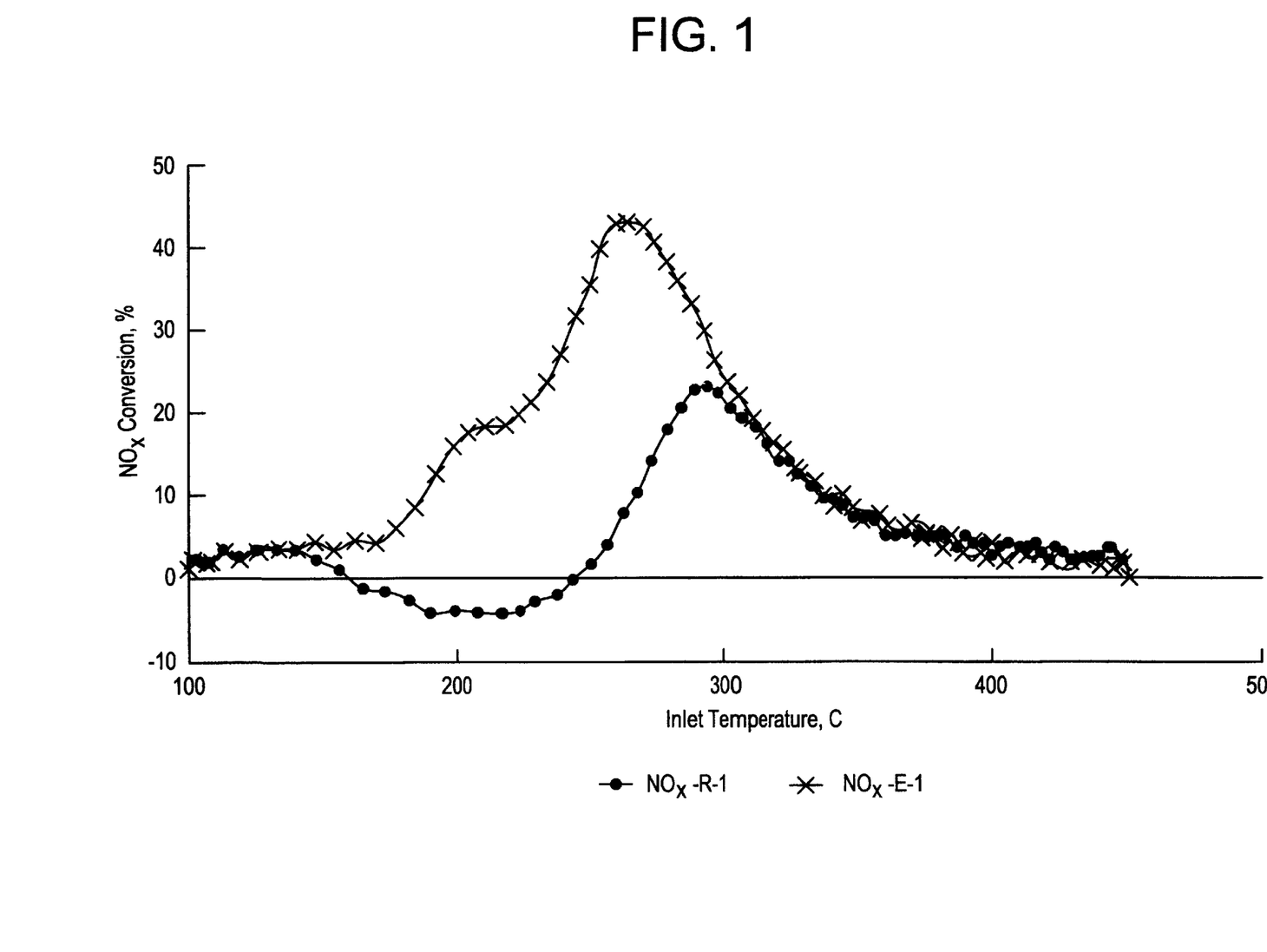
FIG. 1 is a plot of NOx conversion for sample E-1 and comparative sample R-1 as a function of catalyst inlet temperature.

The substrates from R-1 and E-1 were tested in a flow reactor using a gas composition made of 250 ppm NO, 333 ppm $C_3H_6$, 50 ppm $SO_2$, 10% $O_2$, 10% steam, and the balance is $N_2$. The temperature of the catalysts were ramped up from 100° C. to 550° C. at a ramp rate of about 10° C./min. The NOx conversion was calculated and the comparison between R-1 and E-1 catalysts are given in FIG. 1. Comparison of the R-1 catalyst and E-1 catalyst shows that addition of the Pt/ZSM-5 to the diesel oxidation catalyst R-1 enhanced the NOx conversion significantly. The NOx conversion over R-1 with 30 g/$ft^3$ of Pt was only 23%. Addition of the Pt/ZSM-5 with a total Pt loading in E-1 of 40 g/$ft^3$ almost doubled the NOx conversion and gave a significantly broader temperature for NOx conversion.

EXAMPLE 3

Reference Sample R-2

11.3 g of Pt amine hydroxide solution as a $(MEA)_x$ $Pt(OH)_6$ complex (18 weight percent Pt based on the metal)

was diluted in water to give a total weight of solution of 50 g. The solution was impregnated with mixing into 100 g of gamma-alumina having a surface of 90 m²/g After mixing for about 15 minutes, 7.5 g of glacial acetic acid was added to the mixture. 50 g of water was then added to the Pt impregnated alumina and the slurry was ball milled to a particle size of 90% of the particles being less than 10 microns. The slurry was then coated onto a ceramic substrate of dimension 1.5 inch diameter ×3.0 inch long and 400 cells per square inch to a washcoat loading of about 2 g/in³. The total Pt loading in this catalyst was 70 g Pt/ft³. The coated substrate was then dried at 100° C. for 6 hours and calcined at 550° C. for 2 hours. This catalyst is given as reference catalyst 2 (R-2).

EXAMPLE 4 (E-2)

In accordance with this Example a two-layer catalyst structure was prepared from a Top Coat Slurry (Slurry 1) and a Bottom Coat Slurry (Slurry 2). The total Pt metal loading of Top Coat and the Bottom Coat was 70 g/ft³.

Slurry 1. Top Coat Slurry: The top layer was made as follows: 11.7 g of Pt amine hydroxide as a complex of $(MEA)_x Pt(OH)6$ was diluted in water to a total solution weight of 156 g. ZSM-5 was added and mixed for about 30 minutes. 15 g of glacial acetic acid and 30.29 g of silica sol (Nalco 1056) was added as binder. The slurry was ballmilled to a particle size of 90% of the particles being less than 10 microns. This formed Pt/ZSM-5 in combination with a binder as a top coat composition.

Slurry 2. Bottom Coat Slurry: The bottom coat was made as follows: 47 g of Pt amine hydroxide as a complex of $(MEA)_x Pt(OH)6$ was diluted with 287 g of water and 300 g of alumina was added and ballmilled for 2 hours. 30 g of glacial acetic acid was added to fix the platinum on the alumina support. This was followed by 100 g of Beta zeolite and 100 g of water. The slurry was ballmilled to a particle size of 90% less than 10 microns. Water was added to make about 45% solid. This formed an alumina-supported platinum plus Beta Zeolite as a bottom coat composition.

A ceramic substrate of 1.5 inch diameter×3.0 inch long and 400 cpsi was coated with Slurry 2 to a loading of 1.3 g/in³. It was dried at 100° C. for 6 hours and calcined as a bottom coat at 550° C. for 2 hours. It was cooled to room temperature. A top coat was coated onto the bottom coat using the top coat slurry (Slurry 1) to a loading of 0.75 g/in³ made of Pt/ZSM-5 to a make up a total wash coat loading of 2 g/in3 with a total Pt loading of 70 g/ft³. The coated catalyst was then dried at 100° C. for 6 hours and calcined at 550° C. for 2 hours. The catalyst is Experimental Catalyst 2 (E-2).

Figure 2:
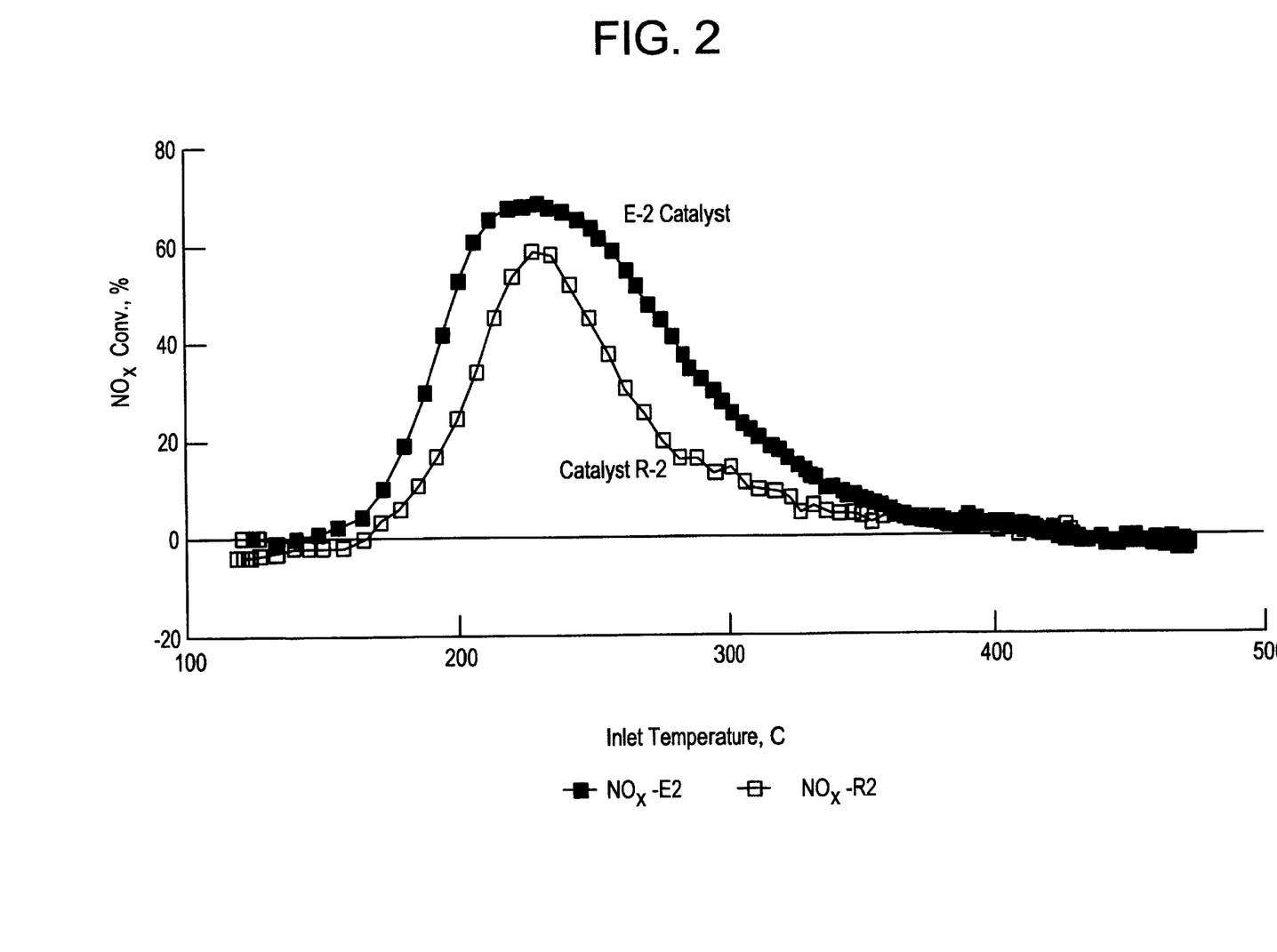
FIG. 2 is a plot of NOx conversion for sample E-2 and comparative sample R-2 as a function of catalyst inlet temperature.

The NOx conversion over both catalysts in Examples 3 (R-2) and 4 (E-2) were evaluated in a reactor using a feed gas composition of 250 ppm NOx, 1000 ppm based on carbon (C1) (using $C_3H_6$ as the reductant) 50 ppm $SO_2$, 10% oxygen, 10% steam, and balance nitrogen. The catalyst was tested at 25,000/h space velocity at a temperature ramp up rate of 10° C./minute. The results shown in FIG. 2 clearly shows that the catalyst E-2 showed higher NOx conversion over a broader temperature range than the $Pt/Al_2O_3$ (R-2).

EXAMPLE 5 (E-3)

A catalyst was made by mixing two components of equal proportions of $Pt/Al_2O_3$ and Pt/ZSM-5. The $Pt/Al_2O_3$ was prepared as described in reference catalyst R-2 in Example 3. The Pt/ZSM-5 was prepared by ballmilling a 75 g of ZSM-5, 50 g of water, 9.85 g of $(MEA)_x Pt(OH)_6$, 7.5 g of glacial acetic acid, and 7.5 g of water. The slurry was ball milled so that 90% of the particles are at a size less than 10 micrometers. This was followed by adding 9.4 g of a silica-alumina sol binder and milling for an extra 30 minutes. The percent solids in the finished slurry was 50%. The slurry was coated onto a ceramic substrate of 1.5 inch diameter×3.0 inch long dimension with 400 cells per square inch. The catalyst was then dried overnight and calcined at 550° C. for 2 hours. The wash coat loading of the calcined catalyst was 2 g/in³ and the total Pt loading was 70 g/ft³. This catalyst was labeled Experimental Catalyst E-3.

Figure 3:
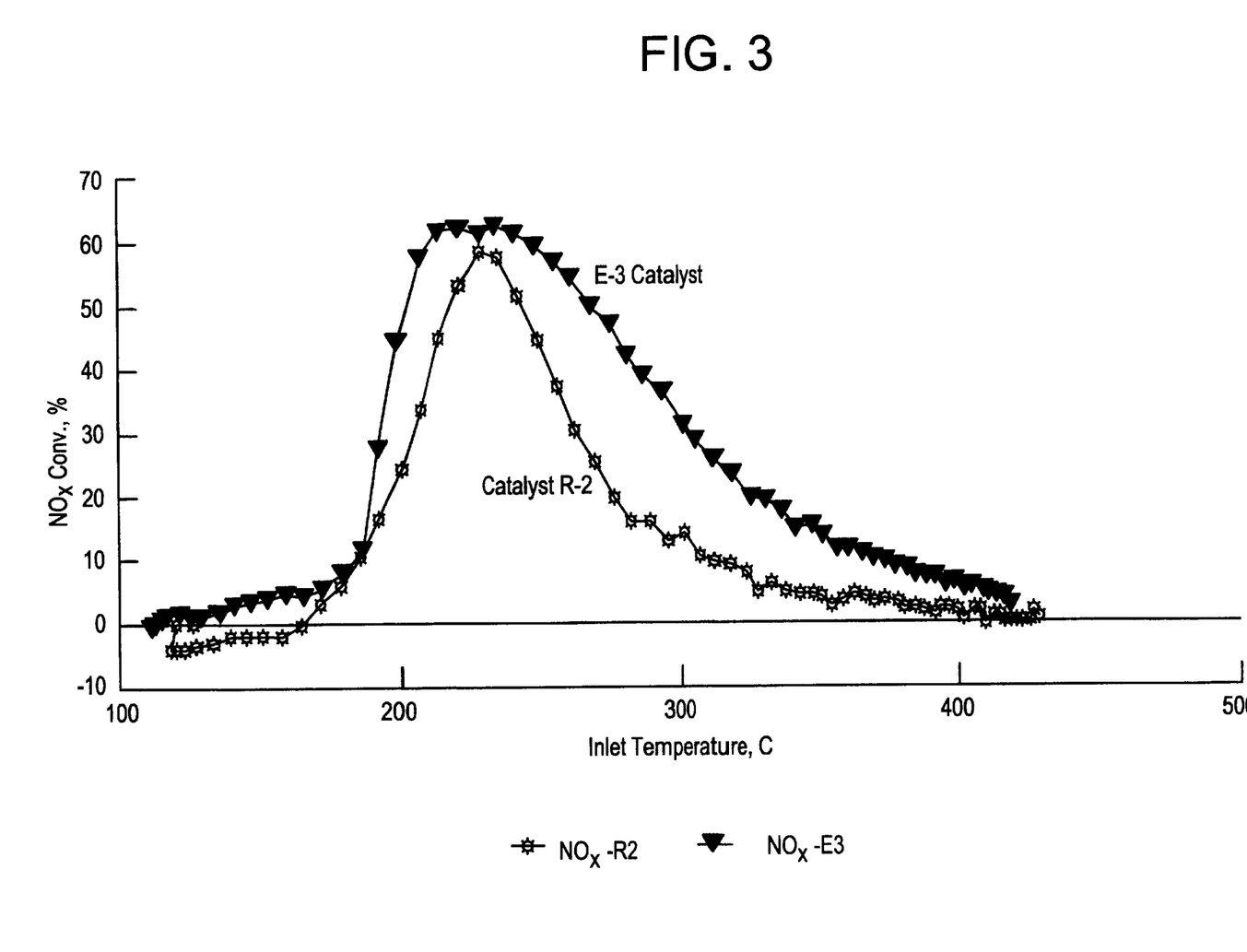
FIG. 3 is a plot of NOx conversion for sample E-3 and comparative sample R-2 as a function of catalyst inlet temperature.

The catalyst was tested as described in the procedure outlined in Example 4. The results of testing is given in FIG. 3. The NOx conversion was compared in FIG. 3 with the reference catalyst R-2 coating having the same level of Pt. It is clear from the results FIG. 3 that addition of the Pt/ZSM-5 to the $Pt/Al_2O_3$ resulted in significant broadening of the temperature where NOx is reduced.

EXAMPLE 6

Utilization of Trapped HC to Reduce Gas Phase NOx

A catalyst composition prepared having 30 weight percent Beta zeolite, 28.5 weight percent ZSM-5, and the balance of 38.5 weight percent alumina, 2.8 weight percent Pt (based on Pt metal). Pt as a complex of $(MEA)_x Pt(OH)_6$ was added to a combination of gamma-alumina and ZSM-5. The Pt was first added to ZSM-5 and alumina. It was fixed using glacial acetic acid to minimize the concentration of Pt on the Beta zeolite. The Beta zeolite was added after fixing. The composition was formed into an aqueous slurry having 48 weight percent solids. The slurry was coated as a single coating at a loading of 2 g/in³ on same type of substrate used in Examples 3 and 4. The coated substrate was dried for 6 hours at 100° C. and calcined for 2 hours at 550° C.

Figure 4:
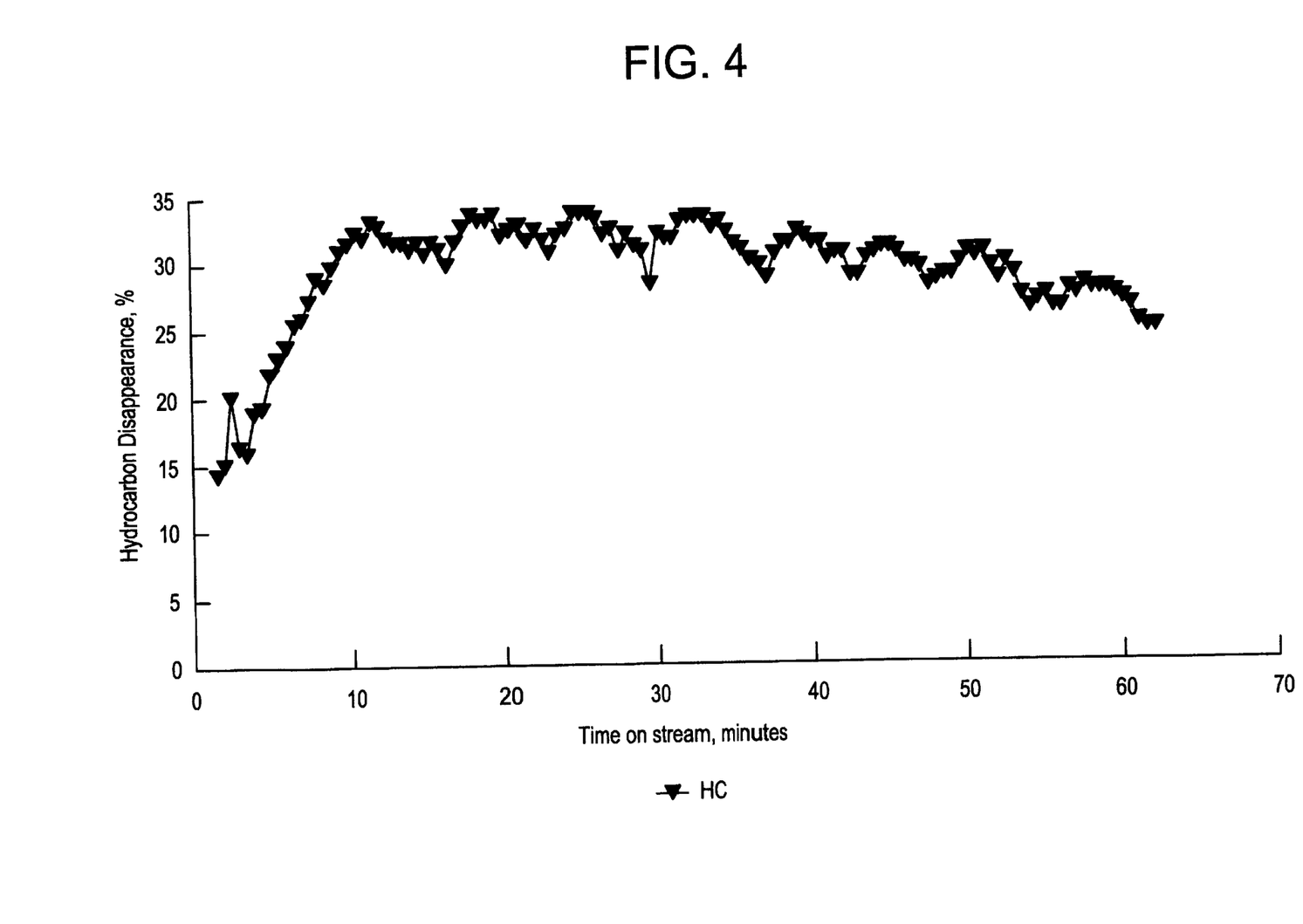
FIG. 4 is a plot of percent hydrocarbon disappearance (Example 6) as a function of Time on stream (minutes), at 135° C. at steady state for propylene and decane, where the catalyst was aged in an air stream containing 5% propylene and decane, and 20 ppm $SO_2$ at 750° C. for 16 hours.
Figure 5:
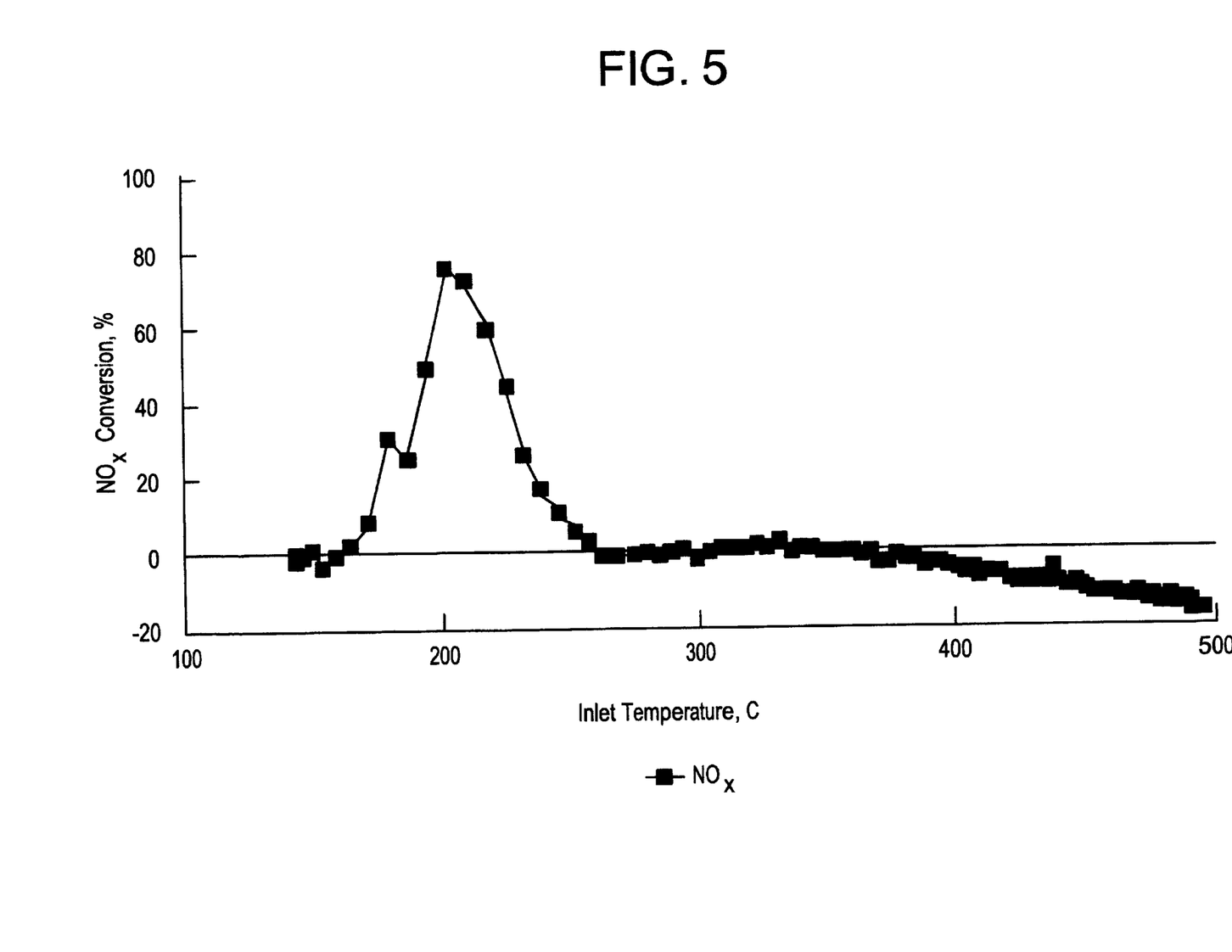
FIG. 5 is a plot of percent NOx conversion as a function of inlet temperature in Example 6.

The HC trapping capacity of the catalyst was tested at steady state conditions at 135° C. and at a space velocity of 25,000/h in the presence of 250 ppm NOx, 200 ppm C1 (made of equal concentration of propylene and decane), 25 ppm $SO_2$, 105 ppm $O_2$, 10% steam, and balance $N_2$. As shown in FIG. 4, the HC was trapped at a rate of 35% over a period of over 30 minutes. The trapped HC was then used to reduce the NOx in the gas phase. The experiment was carried out by ramping up the temperature between 135° C. and 500° C. at a rate of 10° C./minute using a feed gas composed of all components described above minus the hydrocarbon. The hydrocarbon concentration in the gas phase during the ramp up experiment was zero. As shown in FIG. 5, the trapped HC was successfully used to reduce almost 80% of the NOx present in the gas phase.

Example 6 shows the improvement achieved by use of the compositions of the present invention. The trapping component mixed with the Pt type catalyst allowed for taking advantage of the HC present in the exhaust gas. The HC cannot be treated at low temperatures typically below 150° C. As shown in FIG. 5, as the temperature increases to about 150° C., NOx conversion begins. This is due to the utilization of the hydrocarbons trapped by the zeolite. As the temperature increased to about 200° C. the conversion of gas phase NOx reached a maximum of about 80%. At this time, the trapped hydrocarbons were becoming used and the conversion of NOx decreased even at higher temperatures. The use of trapped HC to reduce NOx at higher temperatures is essential for the successful application in a diesel exhaust.

What is claimed:

1. A catalyst comprising:

a catalyst carrier having a carrier surface;

a bottom layer on the carrier surface, the bottom layer comprising a first catalyst composition, wherein the first catalyst composition comprises:
 a support component;
 a platinum component located on the support component; and
 at least one first zeolite component comprising a zeolite in the substantial absence of a precious metal component; and a second layer on the bottom layer, the second layer comprising a second catalyst composition, wherein the second catalyst composition comprises:
 at least one second zeolite component comprising a zeolite and a platinum component.

2. The catalyst as recited in claim 1 wherein the support component comprises a refractory compound.

3. The catalyst as recited in claim 1 wherein the catalyst further comprises at least one compound selected from titania, zirconia, alkaline earth metal oxides, and rare earth oxides.

4. The catalyst as recited in claim 1 wherein the second layer further comprises a binder.

5. The catalyst as recited in claim 1 wherein the first zeolite comprises a three-dimensional zeolite characterized by pore openings whose smallest cross-sectional dimension is at least about five Angstroms and having a silicon to aluminum atomic ratio of greater than 5.

6. The catalyst as recited in claim 1 wherein the first zeolite is beta zeolite a nd the second zeolite is ZSM-5.

7. The catalyst as recited in claim 1 wherein the second zeolite is selected from the group consisting of faujasites, pentasils, mordenites, and Y.

8. The catalyst as recited in claim 1 wherein the catalyst carrier has a plurality of parallel exhaust flow passages extend there through and defined by passage walls on which the platinum component is present in a quantity sufficient to provide from about 5 to about 250 g/ft$^3$ of platinum.

9. The catalyst as recited in claim 1 wherein the catalyst carrier has a plurality of parallel exhaust flow passages extend therethrough and defined by passage walls.

10. The catalyst as recited in claim 8 comprising supported platinum present in a quantity sufficient to provide from about 10 to about 150 g/ft$^3$ of platinum.

11. The catalyst as recited in claim 8 wherein the second zeolite comprises from about 5 to about 75 g/ft$^3$ of platinum component, and the precious metal on the support comprises from about 5 to about 75 g/ft$^3$ of platinum component.

12. The catalyst as recited in claim 7 wherein the second zeolite comprises ZSM-5.

13. The catalyst as recited in claim 1 wherein the first zeolite comprises a trivalent metal which in combination with Si forms the oxidic skeleton of the first zeolite, and an exchangeable cation which comprises substantially no precious metal.

14. The catalyst as recited in claim 1 wherein the second zeolite comprises a trivalent metal which in combination with Si forms the oxidic skeleton of the second zeolite, and an exchangeable cation.

15. The catalyst as recited in claim 14 wherein the trivalent metal of the second zeolite comprises at least one metal selected from the group consisting of Al, B, Ga, In, Fe, Cr, V, As and Sb and the exchangeable cation is Pt.

16. The catalyst as recited in claim 13 wherein the trivalent metal of the first zeolite comprises at least one metal selected from the group consisting of Al, B, Ga, In, Fe, Cr, V, As and Sb and the exchangeable cation of the first zeolite is a cation selected from the group consisting of hydrogen and at least one metal selected from the group consisting of Li, Na, K, Rb, Cs, Mg, Ca, Sr, Ba, Cr, Mn, Fe, Co, Ni, Cu, Nb, Ma, Ta, W and Re.

17. The catalyst as recited in claim 16 wherein the first zeolite is selected from the group consisting of pentasils, mordenites, Y and beta zeolites.

18. The catalyst as recited in claim 17 wherein the first zeolite comprises beta zeolite.

19. A method for treating a diesel engine exhaust stream containing nitrogen oxides, carbon monoxide, gaseous hydrocarbons and a volatile organic fraction comprising the steps of:

contacting the stream with the catalyst of any one of claims 1, 17 or 18, adsorbing at least some of the hydrocarbons on the first zeolite component when the exhaust stream temperature is cool;

heating the catalytic composition;

desorbing the hydrocarbons from the first zeolite component;

reducing at least some of the nitrogen oxides to nitrogen in the presence of the precious metal component and at least some of the desorbed hydrocarbons; and oxidizing the hydrocarbons and carbon monoxide.

20. A catalyst comprising:

a support component;

a platinum component located on the support component;

at least one first zeolite component comprising a beta zeolite in the substantial absence of a precious metal component; and at least one second zeolite component comprising a zeolite and a platinum component.

21. A method for treating a diesel engine exhaust stream containing nitrogen oxides, carbon monoxide, gaseous hydrocarbons and a volatile organic fraction comprising the steps of:

contacting the stream with the catalyst of claim 20, adsorbing at least some of the hydrocarbons on the first zeolite component when the exhaust stream temperature is cool;

heating the catalytic composition;

desorbing the hydrocarbons from the first zeolite component;

reducing at least some of the nitrogen oxides to nitrogen in the presence of the precious metal component and at least some of the desorbed hydrocarbons; and oxidizing the hydrocarbons and carbon monoxide.

* * * * *